May 28, 1957  A. E. ALLWES  2,793,876
HYDRAULIC MEANS FOR PROPELLING VEHICLES
Filed Oct. 20, 1954
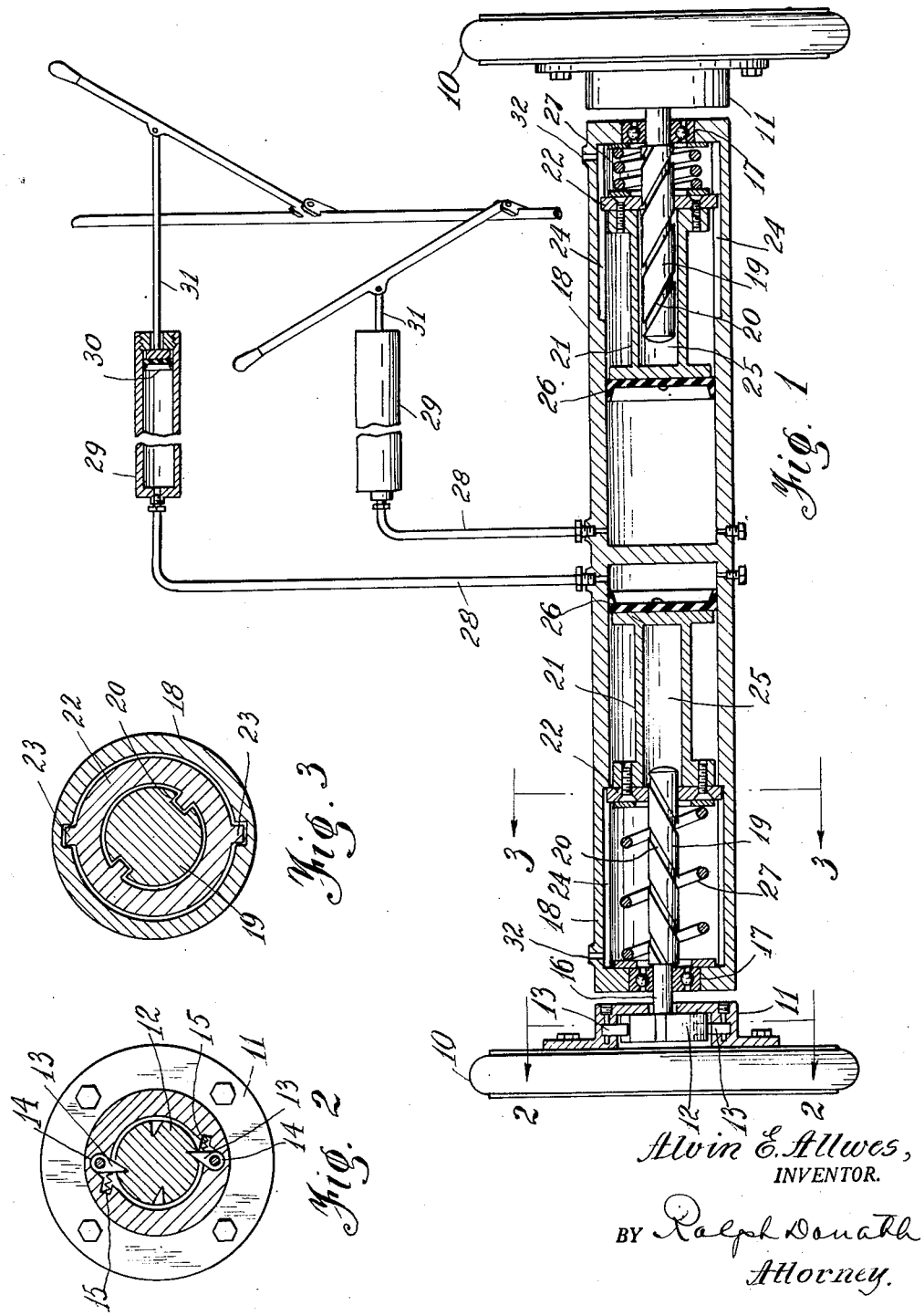
Alvin E. Allwes,
INVENTOR.
BY Ralph Donath
Attorney.

United States Patent Office 2,793,876
Patented May 28, 1957

2,793,876

HYDRAULIC MEANS FOR PROPELLING VEHICLES

Alvin E. Allwes, Pittsburgh, Pa.

Application October 20, 1954, Serial No. 463,496

3 Claims. (Cl. 280—216)

This invention relates to vehicle driving mechanism and particularly to a hydraulic driving mechanism of simplified design which may be utilized in driving various classes of vehicles.

Power transmitted to the driving wheels of a vehicle is usually carried by one or more well known mechanical linkages. These mechanical linkages are subject to wear, require constant lubrication and maintenance and in time become so worn as to be wasteful of power.

The present invention provides a hydraulic driving mechanism of simplified design which overcomes all of the above mentioned defects of the conventional mechanical drives.

An object of the present invention is to provide a hydraulic driving mechanism for vehicles capable of converting reciprocating motion at a driving cylinder into rotary motion at the wheels.

Another object of the present invention is to provide hydraulic mechanism for driving vehicles having provision for differential action between two driven wheels.

A further object of this invention is to provide a hydraulic drive means wherein there is substantially no mechanical wear and the parts are constantly operating in a bath of lubricant.

While certain objects and advantages of this invention have been pointed out above, other objects and advantages will become apparent from a consideration of the following description and the accompanying drawings in which:

Figure 1 is a plan view partly in section of a driving mechanism according to this invention.

Figure 2 is a section on the line 2—2 of Figure 1.

Figure 3 is a section on the line 3—3 of Figure 2.

Referring to the drawings there is illustrated a pair of driving wheels 10. Each such driving wheel is fixed to a housing 11 surrounding a ratchet wheel 12. A plurality of spaced pawls 13 are pivoted in openings 14 in the housing 11. Each pawl 13 is spring loaded by a spring 15 urging the pawl into a radial position with respect to the ratchet wheel 12.

The ratchet wheel 12 is mounted on the end of a stub shaft 16 journaled in bearings 17 in a main drive and axle housing 18. A threaded drive shaft portion 19 is formed on the shaft 16 within the housing and is provided with a helical thread 20. The interior of the housing 18 is formed as a hollow cylinder and is fitted with a piston 21 slidable therein. The piston 21 is provided with a threaded head portion 22 engaging the thread 20 of the shaft 19. Each head portion 22 is provided with radial guide lugs 23 which slide in position of slots 24 in the cylindrical interior of the housing 18. The position is provided with an axially extending hollow bore 25 adapted to receive the end of the drive shaft 19. The end of the piston 21 opposite the head portion 22 is provided with a packing member 26 or cup, preferably of resilient material such as neoprene which will withstand the action of the hydraulic fluid. A spring 27 is provided in the housing 18 to urge the piston 21 away from the wheel 10. Each cylinder is connected to a hydraulic line 28 which is in turn connected to a hydraulic drive cylinder 29. Each hydraulic drive cylinder 29 is provided with a piston 30 driven by a lever arm 31 of one sort or another.

In operation hydraulic fluid is forced from the drive cylinder 29 by moving the piston 30 therein. The fluid passes through line 28 into the housing 18 behind the piston end packing 26. This forces the piston 21 to move axially in the housing. The piston head 23 slides along the threads 20 of the drive shaft 19 causing it to rotate in the bearing 17 and to turn the ratchet wheel 12. Rotation of the ratchet wheel 12 in turn causes rotation of the drive wheels 10 by means of the engagement of the ratchet wheel 12 on the pawl 13.

When the piston 30 is returned in the cylinder 29, the piston 21 is returned in the housing 18 to its starting position under pressure of air entering the housing 18 through the opening 32 and pressure of the return spring 27. As the piston 21 returns to its starting position the shaft 19 is rotated in the direction opposite to its driving direction but does not affect the forward rotation of the drive wheels 10 because of the action of the pawls 13 sliding freely over the ratchet wheels.

Preferably the two opposite drive wheels 10 are actuated alternately to supply constant driving force on the wheels however this is not necessary and force can be applied simultaneously to both wheels 10.

The arrangement of the present invention is advantageous in that because of the ratchet wheel and pawl arrangement it is possible to obtain a differential action on the wheels when making a turn and yet the disadvantage of conventional differentials which robs all power from one wheel if the opposite wheel is spinning is absent from this construction.

While a preferred embodiment of this invention has been illustrated and described it will be understood that it may be otherwise embodied within the scope of the following claims.

I claim:

1. A hydraulic drive for vehicles and the like comprising a pair of spaced drive wheels, a pair of separate cylinders between said wheels on a common axis with the wheels, a stub shaft journaled intermediate its ends for rotation in each of said cylinders axially aligned therewith and carrying the drive wheels, a ratchet and pawl connection between the drive wheels and the stub shaft, a threaded portion on each of said stub shafts within the cylinder, a piston in each cylinder surrounding the threaded portion of the stub shaft and movable axially of the cylinder, means on the piston threadingly engaging the threads of the stub shaft, means on the piston preventing rotation thereof within the cylinder, a source of fluid under pressure alternately delivering fluid to each of the cylinders to move the pistons axially therein to rotate the stub shafts independently and resilient means in each cylinder acting on the piston therein to return said piston in the cylinder after each fluid delivery thereto.

2. A hydraulic drive as claimed in claim 1 wherein the ratchet and pawl connection includes a ratchet wheel on one end of each stub shaft and the drive wheels are provided with a housing surrounding the ratchet wheel and supported on the stub shaft and the pawl is pivotally mounted in the housing and engageable with the ratchet wheel to be driven thereby on rotation of the ratchet wheel.

3. A hydraulic drive as claimed in claim 1 wherein the means on the piston preventing rotation thereof within the cylinder are radially extending lugs sliding in guide slots in the interior of the cylinder.

(References on following page)

References Cited in the file of this patent

UNITED STATES PATENTS

| | | |
|---|---|---|
| 408,745 | Pool | Aug. 13, 1889 |
| 425,471 | Toense | Apr. 15, 1890 |
| 850,953 | McDowell | Apr. 23, 1907 |
| 1,012,847 | Hatfield et al. | Dec. 26, 1911 |
| 1,313,081 | Finney | Aug. 12, 1919 |
| 1,423,386 | Bair | July 18, 1922 |
| 1,553,239 | Hauser | Sept. 8, 1925 |
| 1,951,032 | Nardone | Mar. 13, 1934 |
| 2,468,943 | Parsons | May 3, 1949 |